United States Patent [19]

Cameron et al.

[11] Patent Number: 4,622,921
[45] Date of Patent: Nov. 18, 1986

[54] COMBINED SULPHUR BURNING FURNACE AND BOILER

[75] Inventors: Gordon M. Cameron, North York; John McFarland, Pickering, both of Canada

[73] Assignee: C-I-L Inc., North York, Canada

[21] Appl. No.: 801,600

[22] Filed: Nov. 25, 1985

[51] Int. Cl.⁴ .............................................. F22D 1/00
[52] U.S. Cl. ..................................... 122/7 C; 110/234
[58] Field of Search ...................... 122/7 B, 7 C, 7 D; 110/234

[56] References Cited

U.S. PATENT DOCUMENTS 2,840,049  6/1958  Durham ............................ 122/7 D
4,014,296  3/1977  Astrom ............................ 122/7 C Primary Examiner—Edward G. Favors
Attorney, Agent, or Firm—C. Brian Barlow

[57] ABSTRACT

A combined sulphur burning furnace and water-cooled boiler arrangement for producing a cooled, gaseous sulphur dioxide-air mixture in which the furnace is located below the boiler tubes arrangement in a vertical, cylindrical shell. The hot gases produced in the furnace exit axially into an upper chamber defined by the water-tube arrangement and pass through the cooling water-tube arrangement in radial outward flow to an outer chamber provided with cold-side by-pass control means and then exit the shell. The apparatus provides for savings in ducting, foundations, piping and the like; and permits more efficient sulphur burning and cooling.

6 Claims, 3 Drawing Figures

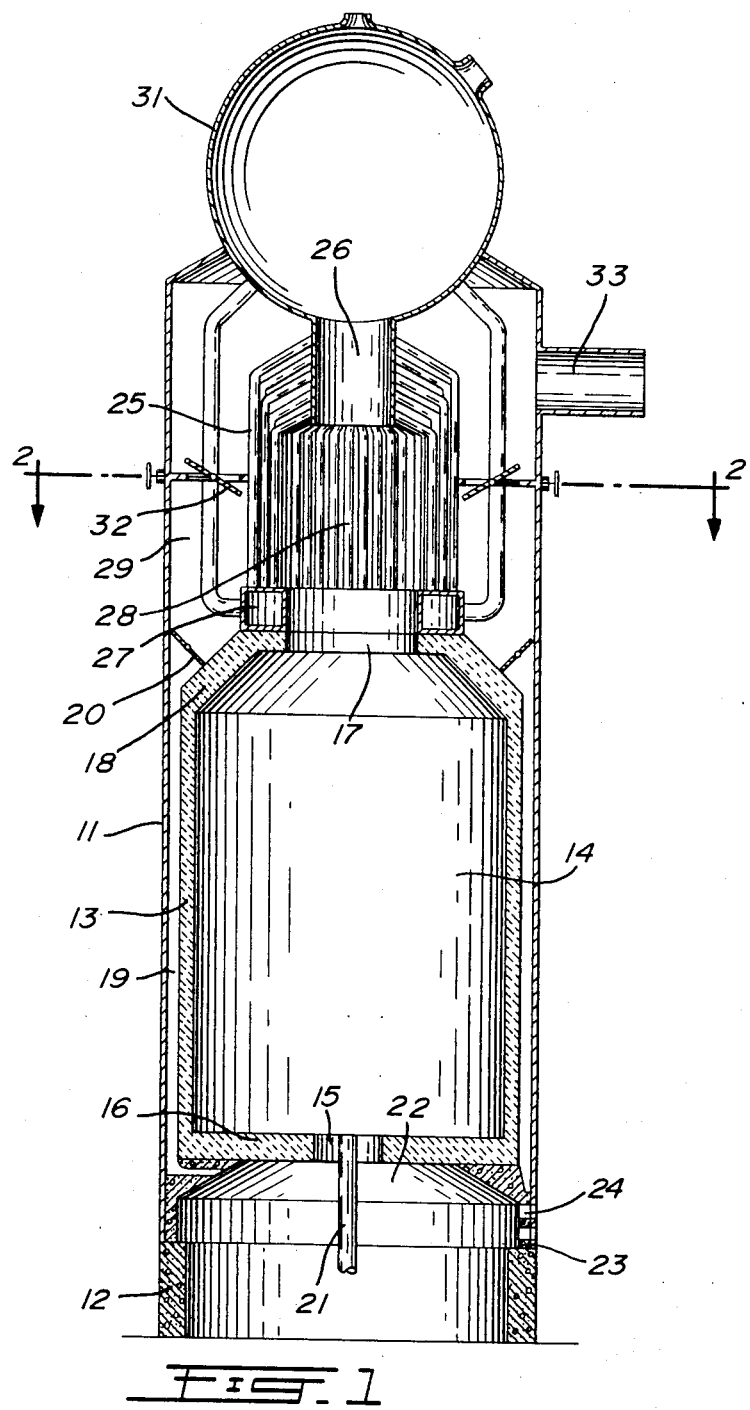

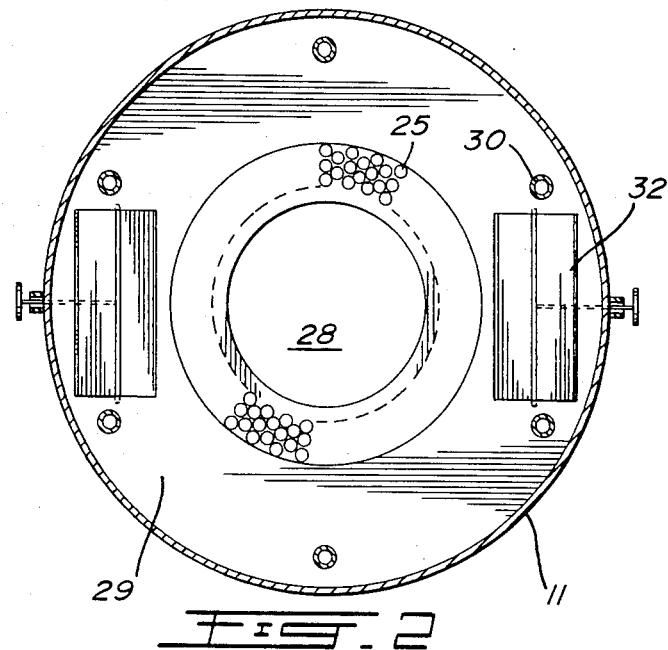
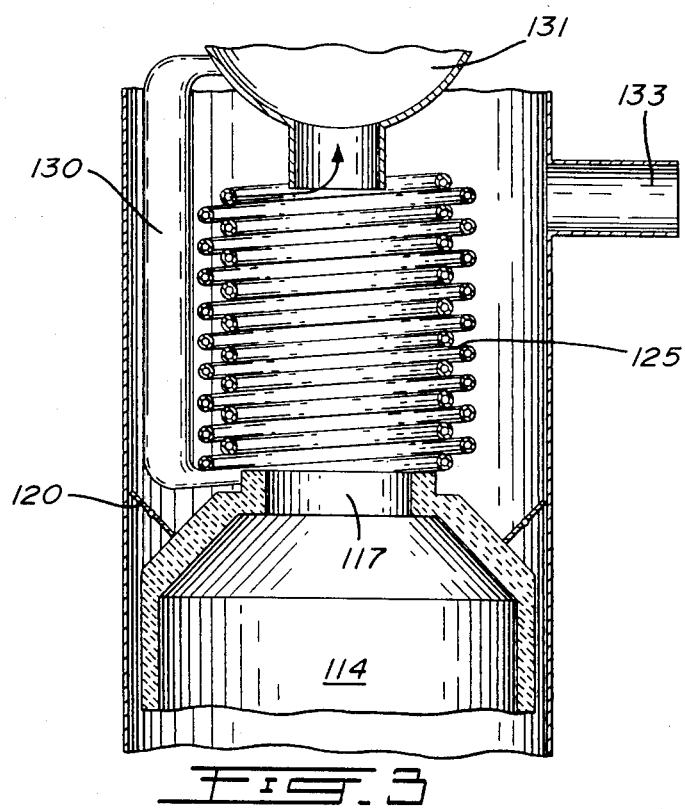

COMBINED SULPHUR BURNING FURNACE AND BOILER

This invention relates to apparatus for the production of sulphur dioxide from the burning of sulphur in air and, more particularly, to an integral furnace and boiler combination for the production of a cooled gaseous sulphur dioxide-air mixture.

Sulphur combustion is most commonly carried out as part of the manufacturing operation associated with the production of sulphur dioxide for sulphuric acid manufacture. The sulphur burning is normally carried out by spraying molten sulphur from one or more guns in an air stream into a large cylindrical brick-lined furnace. The hot sulphur dioxide containing gases produced are typically at temperatures in the 800° C. to 1200° C. range and are generally transferred through brick-lined ducting to a boiler where the gas is cooled to temperatures in the range 350° C. to 600° C. Generally, this boiler is either a fire-tube boiler of horizontal cylindrical design, or, of the older, watertube design.

The fire-tube boiler as is presently used in commercial sulphuric acid production has a number of serious disadvantages. The lengths of the furnace and boiler create significant problems in plant layout and design in allowing for thermal expansion of component parts. Further, because this type of boiler has heavy metal exposed to the hot, incoming gases, it requires significant protection by the use of ferrules and castable refractory materials. Such boilers are also not readily useable in modern sulphuric acid plants which use increasingly higher stream pressures, for example, up to 60 atmospheres pressure. In addition to the disadvantages posed with high temperature and high pressure gas flows in a fire-tube boiler system, the normal mode of gas regulation is by the use of a hot gas by-pass requiring an adjustable flow control. This is normally provided by means of a metallic valve, but the high temperatures (over 1100° C.) present in most sulphur combustion systems, are beyond the long term service range of most of the metallic materials available. This hot gas by-pass arrangement is a weakness in most sulphuric acid plant combustion systems since hot, sulphur containing gases are extremely corrosive as far as most metals are concerned and this valve is a frequent source of problems.

The water-tube boiler design is generally based on the presence of hot sulphur gases at essentially atmospheric pressure outside the tubes. Designs typically involve tube arrays being rectangular in cross-section having flat sides. In contrast to the fire-tube boiler, there are no thick metal sections exposed to the hot gases and pressure losses are low. Further, the water-tube boiler may be utilized to produce high pressure steam and, in addition, arranged to by-pass gas that has already been partly cooled. However, the serious drawback of using the typical water-tube boiler with a typical sulphur burning furnace is the necessity of making a transition (brick-lined) from a round, pressurized furnace to a square cross-sectional, flat-sided boiler designed for atmospheric pressure with the need to design for asymmetrical expansion of the external steel of the boiler.

It is an object of this invention to provide a combined furnace-boiler arrangement which is simple, compact, economic to operate and which is capable of containing the sulphur dioxide gas pressures over a broad range of temperature operating conditions.

A further object is to provide a furnace-boiler combination which provides symmetrical gas distribution both in the furnace and in the boiler.

In the furnace-boiler combination according to the invention the water-tube principle for boiling/cooling is combined with a radially symmetrical tubing arrangement and an axial gaseous entry to the boiler in such a way that no external or overly exposed hot side exists in the boiler. The symmetrical water-tube arrangement of the boiler offers the further advantage of allowing uniform, highly efficient heat transfer between the hot, sulphur dioxide containing gases and the boiler tubes. Yet, further, any differential expansion problems are more easily dealt with in the furnace-boiler combination of the present invention.

Accordingly, the invention provides apparatus for producing a cooled, gaseous sulphur dioxide-air mixture comprising an external shell of a strong, heat-resistant material; sulphur burning means to provide an upwardly directed axial flow of a hot, gaseous sulphur dioxide-air mixture within said external shell; a plurality of water-cooled boiler tubes within said external shell and so arranged as (a) to define an upper inner chamber above said sulphur burning means to receive said hot gaseous mixture in axial flow from said sulphur burning means, (b) to define with said external shell an upper outer chamber to receive said gaseous mixture from said upper inner chamber by radial outflow, and (c) to permit said radial outflow of said gaseous mixture from said upper inner chamber to said upper outer chamber and to effect cooling of said gaseous mixture; and cooled gaseous mixture exit means.

The furnace-boiler combination comprising the apparatus as hereinbefore defined provides for an upwardly directed axial flow of hot, gaseous sulphur dioxide-air mixture within the external shell. Such a gaseous mixture is produced by the sulphur burning means which may be located outside of and remote from the external shell. In such a case the sulphur burning means includes means for conducting the gaseous mixture to the external shell.

However, it is much preferred that the sulphur burning means is located within a lower part of the external shell directly below the boiler tube arrangement as hereinbefore defined.

The sulphur burning means comprises means for injecting molten sulphur and air into a lower combustion chamber defined by an inner shell of heat resistant material, and wherein the hot sulphur dioxide-air gaseous mixture is produced by the exothermic burning of sulphur. Typically, the molten sulphur is ejected from one or more sulphur guns disposed within a windbox. Air enters the windbox and passes, along with the sulphur in the form of droplets, to the combustion chamber. The resultant hot, sulphur dioxide-air gaseous mixture exits this lower chamber upwardly to the boiler and axially of the external shell.

Accordingly, the invention provides an apparatus as hereinbefore defined wherein said sulphur burning means is located within a lower part of said external shell and comprises molten sulphur injection means, air injection means, and an inner shell of heat-resistant material defining a sulphur burning lower chamber wherein said sulphur is burned in air to provide said upwardly directed axial flow of hot gaseous sulphur dioxide-air mixture.

In a more preferred apparatus the upper outer chamber is provided with gaseous mixture flow control means which offers cold-side by-pass control. Such a feature permits the use of metallic diaphragm and valve systems having reasonable lengths of service for the useful control of the sulphur dioxide gases emanating from the apparatus.

In a still more preferred apparatus the external and inner shells define a narrow circumferential sweep passage to the upper outer chamber through which air is passed to sweep out any hot, sulphur gases percolating through the inner shell which is generally formed of porous fire-brick. This reduces corrosion of the external shell, which is typically formed of carbon steel, adjacent the inner shell.

In order that the invention may be better understood a preferred embodiment will now be described by way of example only with reference to the accompanying drawings in which:

FIG. 1 is a diagrammatic vertical section of a preferred furnace-boiler arrangement according to the invention;

FIG. 2 is a section on the line 2—2 of FIG. 1; and

FIG. 3 is a diagrammatic vertical section of an alternative tubular arrangement of boiler tubes in the furnace-boiler according to the invention.

FIG. 1 shows a vertical cylindrical tower 10 having a heat-resistant carbon steel shell 11 supported on a concrete foundation 12 and embracing an integral furnace and boiler combination.

Within the lower part of shell 11 is a fire-brick inner shell 13 which defines a lower combustion chamber 14 having an axial opening 15 in its floor 16, and an axial opening 17 in its roof 18. Inner shell 13 and external shell 11 define a circumferential sweep passage 19 having air flow control dampers 20 at its upper part. Protruding through opening 15 is a sulphur gun 21 axially disposed within a windbox 22. Windbox 22 is connected to air inlet ducting 23 via air passageways 24.

Within the upper part of shell 11 is a plurality of carbon steel boiler tubes 25 arranged in the general form of a plurality of concentric rings. More specifically, each of tubes 25 has a substantial portion of its length axially disposed and a minor portion at its upper end more radially disposed within shell 11. Each of tubes 25 is connected at its upper end to an axially disposed upper header 26 and at its lower end to an annular lower header 27. The annular arrangement of tubes 25 with, in the embodiment shown, the upper header 26 defines an upper inner chamber 28 having opening 17 in common with roof 18; whereas with external shell 11, the tube arrangement defines an annular upper outer chamber 29.

Connected to lower header 27 is a plurality of downcomers 30 (six in the embodiment described) which are axially disposed within upper outer chamber 29. Downcomers 30 and upper header 26 are connected to a spherical steam drum 31 supported by the top of shell 11 and inner components within shell 11. Upper outer chamber 29 has a pair of gaseous mixture flow control valves 32. Chamber 29 connects with gas exit ducting 33.

Lower header 27 is supported and shielded by roof 18 from radiation emanating from combustion chamber 14, whereas upper header 26 is only marginally exposed to said radiation.

In operation, air enters windbox 22 through ducting 23 and is injected through axial opening 15 into chamber 14 along with molten sulphur injected from gun 21. The sulphur droplets and air are mixed by the vortex created by the air entry and produce a hot, gaseous sulphur dioxide-air mixture which leaves the furnace in axial flow through opening 17 to upper inner chamber 28.

The hot, gaseous mixture now flows radially outwards from chamber 28 through the annular arrangement of water-cooled boiler tubes 25, which effect cooling of the hot, gaseous mixture, to upper outer chamber 29 and on through exit ducting 33.

In the specific boiler arrangement shown, water circulation is by means of a thermosyphon mechanism, wherein water downflows in the downcomers 30 to the lower header 27 and a mixture of water and steam flows upwards in tubes 25 to axial header 26 and on to vapour-liquid separator steam drum 31. Upper header 26 represents an axially symmetrical effective pressure containing shape. Downcomers 30 and steam drum 31 are protected from the hot, gaseous mixture and are contained and supported in the single structure. The number of downcomers and water-tubes are, obviously, totally flexible as is the nature of the lower header.

Gas temperature control at the boiler exit is achieved by use of valves 32, which split and control the gas flow path through the boiler into two paths, one of which can be essentially cut-off by use of one of valves 32. Thus, by-pass control is easily achieved by the separation of the cooled gas. Isolation of one path through closure of one of valves 32 results in significantly less heat transfer, while at the same time the location of the isolating devices in the cold chamber offers improved reliability.

In the embodiment shown, corrosion of external shell 11 at its lower part adjacent inner shell 13 by the percolation of hot sulphur gases through the fire-brick is greatly reduced by the provision of air sweeping through passage 19. Air flow control in such sweeping is available by means of dampers 20.

In the embodiment described hereinabove, the tubular arrangement of the boiler tubes is amenable to thermosyphon operation of the boiler system wherein the tubes are disposed substantially parallel and axial of the shell, with flow of the two phase heated water rising vertically in the tubes to the upper header and steam drum and colder water flowing down the downcomers within the external (cold) chamber to the lower header.

In an alternative arrangement the boiler tubes may constitute one or more concentric helical coils coaxial of the shell and constituting a boundary between the upper inner and upper outer chambers of the boiler.

Referring to FIG. 3, the drawing shows a series of helical carbon steel coils 125 coaxial of the shell 11 to provide a series of substantially radially arranged boiler tubes. A downcomer 130 feeds cooling water to the tubes from which heated water exits to upper header 126.

It can, thus, be seen that in the apparatus hereinbefore described, the sulphur combustion and gaseous mixture cooling takes place in a single vertical cylindrical tower incorporating a lower combustion chamber set below a radial outwards gas flow water-tube boiler having axial gas entry and with cold side by-pass flow control.

In summary, this invention offers some or all of the following advantages not available with prior apparatus:

(a) upwards gas flow to allow large sulphur droplets more time to burn as a consequence of the tendency of droplets to fall;

(b) symmetrical axial entry of the hot gaseous mixture from the furnace to the boiler tube arrangement to allow for more efficient cross-sectional area interaction between the tubes and radially outflowing hot gaseous mixture than is seen in single cross flow boilers;

(c) protection of all of the thick metal sections of the boiler system and the temperature control system by water-filled tubing;

(d) cost savings in ducting, foundations, piping and the like due to the combined furnace-boiler arrangement within a single unit; and (e) reduced corrosion of the lower part of the external shell because of the air sweep passage arrangement.

Other advantages of the design will be evident to the individual skilled in the art. Additionally, various alternatives involving minor modifications will be further apparent to those skilled in the art. For example, in some cases where it is desired to use multiple sulphur guns, it is possible to operate sulphur combustion using a double ended horizontal cylinder to feed the vertical boiler system. This approach will be useful in larger plants where good sulphur atomization may be difficult to achieve due to the large volumetric flow of sulphur.

We claim:

1. Apparatus for producing a cooled, gaseous sulphur dioxide-air mixture comprising an external shell of a strong heat resistant material; sulphur burning means to provide an upwardly directed axial flow of a hot, gaseous sulphur dioxide-air mixture within said external shell; a plurality of water-cooled boiler tubes within said external shell and so arranged as
   (a) to define an upper inner chamber above said sulphur burning means to receive said hot gaseous mixture in axial flow from said sulphur burning means,
   (b) to define with said external shell an upper outer chamber to receive said gaseous mixture from said upper inner chamber by radial outflow, and
   (c) to permit said radial outflow of said gaseous mixture from said upper inner chamber to said upper outer chamber and to effect cooling of said gaseous mixture; and cooled gaseous mixture exit means.

2. Apparatus as claimed in claim 1 wherein said sulphur burning means is within a lower part of said external shell and comprises molten sulphur injection means, air injection means, and an inner shell of heat resistant material defining a sulphur burning lower chamber wherein said sulphur is burned in air to provide said upwardly directed axial flow of hot, gaseous sulphur dioxide-air mixture.

3. Apparatus as claimed in claim 2 wherein said external shell and said inner shell define a circumferential sweep passage therebetween to said upper outer chamber; and further comprising means for passing air through said passage to said upper outer chamber.

4. Apparatus as claimed in any one of claims 1–3 further comprising gaseous mixture flow control means within said upper outer chamber.

5. Apparatus for producing a cooled gaseous sulphur-dioxide mixture comprising
   (i) foundation means;
   (ii) an external, vertical cylindrical shell of a strong, heat resistant material supported on said foundation means;
   (iii) an inner shell of heat resistant material defining a sulphur burning lower chamber within a lower part of said external shell and supported on said foundation means and wherein sulphur is burned in air to provide an upward axial flow of hot, gaseous sulphur dioxide-air mixture; said inner shell and said external shell defining a circumferential sweep passage the height of said inner shell;
   (iv) means for injecting air into said lower chamber and through said sweep passage;
   (v) means for injecting molten sulphur into said lower chamber;
   (vi) a plurality of water-cooled boiler tubes axially arranged within said external shell above said inner shell so as
      (a) to define an upper inner chamber to receive said hot gaseous mixture in axial flow from said lower chamber;
      (b) to define with said external shell an upper outer chamber to receive said gaseous mixture by radial outflow from said upper inner chamber; and
      (c) to permit said radial outflow of said gaseous mixture from said upper inner chamber to said upper outer chamber and to effect cooling of said gaseous mixture;
   (vii) gaseous mixture flow control means within said outer chamber; and
   (viii) cooled, gaseous mixture exit means.

6. Apparatus as claimed in claim 5 wherein said boiler tubes form part of a thermosyphon loop.

* * * * *